US009055007B2

(12) United States Patent
Bugenhagen

(10) Patent No.: US 9,055,007 B2
(45) **Date of Patent: *Jun. 9, 2015**

(54) SYSTEM AND METHOD FOR MANAGING BURSTING TRAFFIC

(71) Applicant: CenturyLink Intellectual Property LLC, Denver, CO (US)

(72) Inventor: Michael K. Bugenhagen, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 238 days.

This patent is subject to a terminal disclaimer.

(21) Appl. No.: 13/689,998

(22) Filed: Nov. 30, 2012

(65) Prior Publication Data

US 2013/0088957 A1 Apr. 11, 2013

Related U.S. Application Data

(63) Continuation of application No. 12/537,624, filed on Aug. 7, 2009, now Pat. No. 8,331,231.

(60) Provisional application No. 61/095,506, filed on Sep. 9, 2008.

(51) Int. Cl.
*H04L 12/927* (2013.01)
*H04L 12/26* (2006.01)
(Continued)

(52) U.S. Cl.
CPC .......... *H04L 47/808* (2013.01); *H04L 12/2602* (2013.01); *H04L 41/5009* (2013.01); *H04L 43/00* (2013.01); *H04L 43/0829* (2013.01); *H04L 43/087* (2013.01); *H04L 43/0882* (2013.01);

(Continued)

(58) Field of Classification Search
CPC ......... H04L 47/00; H04L 47/10; H04L 47/11; H04L 47/12; H04L 47/20; H04L 47/22; H04L 47/74; H04L 47/78
USPC .............. 370/229, 230, 230.1, 231, 235, 252, 370/235.1, 389
See application file for complete search history.

(56) References Cited

U.S. PATENT DOCUMENTS 5,313,454 A 5/1994 Bustini et al.
6,801,940 B1 * 10/2004 Moran et al. .................. 709/224

(Continued)

OTHER PUBLICATIONS

U.S. Appl. No. 12/537,624; Final Rejection dated Sep. 14, 2011; 27 pages.

(Continued)

*Primary Examiner* — Ahn Ngoc Nguyen
(74) *Attorney, Agent, or Firm* — Swanson & Bratschun, L.L.C.

(57) ABSTRACT

A network device for managing communications. The network device includes a first counter operable to track CIR tokens. The first counter is operable to increase the CIR tokens at a first rate. The network device also includes a second counter operable to track the EIR tokens. The second counter is operable to increase the EIR tokens at a second rate. The network device also includes logic in communication with the first counter and the second counter. The logic is operable to determine whether there are EIR tokens in response to a determination that there are not CIR tokens. The logic is further operable to command the second counter to decrement the EIR tokens in response to a determination that there are EIR tokens. The logic is further operable to communicate a data unit from the network device through a network in response to decrementing the EIR tokens.

20 Claims, 8 Drawing Sheets

(51) Int. Cl.
*H04L 12/911* (2013.01)
*H04L 12/24* (2006.01)

(52) U.S. Cl.
CPC ............ *H04L 43/0888* (2013.01); *H04L 43/16* (2013.01); *H04L 47/74* (2013.01)

(56) References Cited

U.S. PATENT DOCUMENTS

| | | | | |
|---|---|---|---|---|
| 7,467,223 | B2 | 12/2008 | Wu et al. | |
| 8,116,224 | B2 | 2/2012 | Bugenhagen | |
| 8,331,231 | B2 | 12/2012 | Bugenhagen | |
| 2002/0089931 | A1* | 7/2002 | Takada et al. | 370/232 |
| 2003/0152076 | A1 | 8/2003 | Lee et al. | |
| 2004/0100901 | A1 | 5/2004 | Bellows | |
| 2008/0033908 | A1* | 2/2008 | Cooper et al. | 707/2 |
| 2008/0225704 | A1 | 9/2008 | Sheinfeld et al. | |
| 2008/0244061 | A1 | 10/2008 | Kime | |
| 2008/0298243 | A1* | 12/2008 | Martinotti et al. | 370/235 |
| 2010/0054126 | A1* | 3/2010 | Kwan et al. | 370/235 |
| 2010/0061260 | A1 | 3/2010 | Bugenhagen | |
| 2010/0061261 | A1 | 3/2010 | Bugenhagen | |
| 2010/0250733 | A1 | 9/2010 | Turanyi et al. | |

OTHER PUBLICATIONS

U.S. Appl. No. 12/537,624; Interview Summary and Notice of Allowability dated Sep. 17, 2012; 7 pages.

U.S. Appl. No. 12/537,624; Issue Notification dated Nov. 21, 2012; 1 page.

U.S. Appl. No. 12/537,624; Non-Final Rejection dated Mar. 18, 2011; 27 pages.

U.S. Appl. No. 12/537,624; Notice of Allowance dated Aug. 6, 2012; 19 pages.

U.S. Appl. No. 12/537,684; Issue Notification dated Jan. 25, 2012; 1 page.

U.S. Appl. No. 12/537,684; Non-Final Rejection dated Mar. 31, 2011; 20 pages.

U.S. Appl. No. 12/537,684; Notice of Allowance dated Oct. 7, 2011; 11 pages.

* cited by examiner

100
Communications Network 102
Communications Management System 104
Server 106
UNI 108
UNI 110
UNI 111
116
118
CPE
112
CPE
114
CPE
115

SYSTEM AND METHOD FOR MANAGING BURSTING TRAFFIC

RELATED APPLICATIONS

This Application is a continuation of U.S. patent application Ser. No. 12/537,624, filed on Aug. 7, 2009 entitled SYSTEM AND METHOD FOR MONITORING BURSTING TRAFFIC, which claims priority to U.S. Provisional Patent Application Ser. No. 61/095,506 filed on Sep. 9, 2008 entitled "MEF TRTCM Policing Function," the entire contents of which are hereby incorporated by reference in their entirety.

BACKGROUND OF THE INVENTION

The use of and development of communications has grown nearly exponentially in recent years. The growth is fueled by larger networks with more reliable protocols and better communications hardware available to service providers and consumers. In many cases, the communications network, systems, and environments may include any number of service providers, access providers, legs, devices, interfaces and other elements that may complicate tracking performance or compliance for users or customers. In some cases, performance metrics may not be effectively shared or communicated to relevant parties.

BRIEF SUMMARY OF THE INVENTION

A network device for managing communications. The network device may include a first counter operable to track CIR tokens. The first counter may be operable to increase the CIR tokens at a first rate. The network device may also include a second counter operable to track the EIR tokens. The second counter may be operable to increase the EIR tokens at a second rate. The network device may also include logic in communication with the first counter and the second counter. The logic may be operable to determine whether there are EIR tokens in response to a determination that there are not CIR tokens. The logic may be further operable to command the second counter to decrement the EIR tokens in response to a determination that there are EIR tokens. The logic maybe further operable to communicate a data unit from the network device through a network in response to decrementing the EIR tokens.

Another embodiment provides a method for managing bursting traffic. CIR tokens may be incremented at a first-rate. EIR tokens may be incremented at a second rate. A data unit may be received for communications through a network device. A determination may be made whether there are EIR tokens in response to a determination there are no CIR tokens. The EIR tokens may be decremented in response to a determination that there are EIR tokens. The data unit maybe communicated from the network device through a network in response to a determination that there are EIR tokens and in response to decrementing the EIR tokens.

Yet another embodiment provides a network interface for managing communications bursting. The network interface may include a processor for executing a set of instructions and a memory in communication with the processor, the memory being operable to store the set of instructions. The set of instructions may be executed to increment CIR tokens at a first rate, increment EIR tokens at a second rate, receive a baby unit for communication through a user network interface, determine whether there are EIR tokens in response to a determination that there are no CIR tokens, decrement the EIR tokens in response to a determination that there are EIR tokens, and communicate the data unit through a network in response to the determination that there are EIR tokens.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE INVENTION

In one embodiment of the present invention, bandwidth measurements, calculations and other performance metrics may be monitored by logic engines, devices, or other elements to track network and communications path states and communicate alarms during specific conditions and states. In one embodiment, the utilization of bandwidth for standard communications and bursting violations may be tracked. Alarms may be generated for lost or discarded packets in response to levels of bandwidth or bursting by a customer that are not in compliance with technical and service level agreements (SLAs) between the customer and service provider. For purposes of simplicity, one or more customers, organizations, or individuals that have agreements for receiving communications services are referred to herein as a user or users. The illustrative embodiments may be implemented for any of the open systems interconnection (OSI) reference model layers using any number of protocols, standards, and systems.

Figure 1:
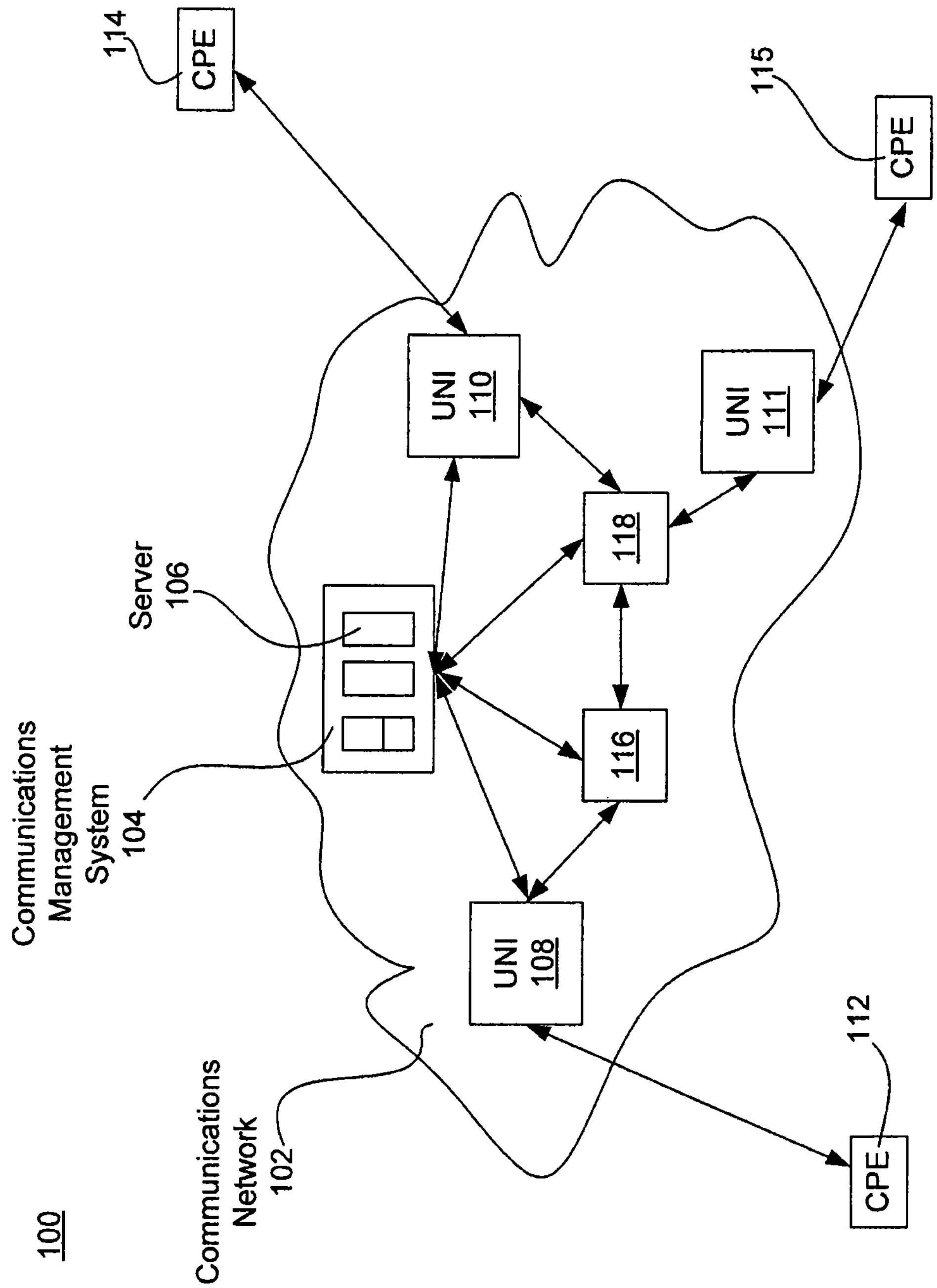
FIG. 1 is a pictorial representation of a communications system in accordance with an illustrative embodiment.

FIG. 1 is a pictorial representation of a communications system in accordance with an illustrative embodiment. The communication system 100 of FIG. 1 includes various elements that may be used for wireless and wired communication. The communications system 100 may include a communications management system 104, a server 106, UNIs 108, 110, and 111, customer premise equipment (CPEs) 112, 114, and 115, and intermediary devices 116 and 118. The communications system 100 may include any number of elements, devices, components, systems, and equipment in addition to other computing and communications devices not specifically described herein for purposes of simplicity. For example, the communications system 100 may also include various maintenance entities (MEs), systems, equipment, devices, rate limiters, policers, and bit shapers.

The different elements and components of the communications system 100 may communicate using wireless communications, such as satellite connections, WiFi, WiMAX, CDMA, GSM, PCS, and/or hardwired connections, such as fiber optics, T1, cable, DSL, high speed trunks, and telephone lines. Communications within the communications system 100 may occur on any number of networks. In one embodiment, the communications network 102 may include wireless networks, data or packet networks, cable networks, satellite networks, private networks, publicly switched telephone networks (PSTN), communications network 102, or other types of communication networks.

The communications network 102 is infrastructure for sending and receiving messages, data, packets, and signals according to one or more designated formats, standards, and protocols. The networks of the communications system 100 may represent a single communication service provider or multiple communications services providers. The features, services, and processes of the illustrative embodiments may be implemented by one or more elements of the communications system 100 independently or as a networked implementation. In particular, alarms may be communicated to specified parties based on packet discards or loss. For example, improper shaping by the CPE 115 that results in utilization of excess bandwidth, unacceptable bursting, or discarded packets at the UNI 111 may be communicated to the user and/or a "far end", such as CPE 112 or UNI 108 via end-to-end protocols, OAM protocols, and/or an external management system. The frame discard alarms may also be sent to any number of other devices and parties within the communications system 100 based on point-to-point or multi-point communications or other reporting agreements or specifications.

In one embodiment, the communications network 102 is a metro Ethernet network (MEN). A metro Ethernet network is a computer network based on the Ethernet standard and covering a metropolitan area. A metro Ethernet network may be used as a metropolitan access network to connect subscribers and businesses to a wider area network, such as the Internet. Certain illustrative embodiments may be implemented utilizing any number of packet-based networks or services, such as a virtual local area network (ULAN).

In one embodiment, a communications service may include performance guarantees, assurances, characteristics, thresholds, parameters, and information with the UNIs 108, 110 and 111, such as a committed information rate (CIR). CIR is a specified amount of guaranteed bandwidth or capacity. Other performance information may include a committed burst size (CBS), an excess information rate (EIR) with an associated excess burst size (EBS), delay, delay variation, loss, and availability for a given class of service (CoS) instance. For example, EIR may be a specific bandwidth capacity with performance guarantees. The UNIs are the physical and electrical demarcation point between individual users and the communications service provider. In one embodiment, the UNIs 108, 110 and 111 interconnect a metro Ethernet network to the CPEs 112, 114, and 115. In another embodiment, the UNIs 108, 110, and 111 represent a network UNI (UNI-N) and the CPEs 112, 114, and 115 represent a customer UNI (UNI-C). As a result, the performance guarantees and bandwidth profiles may be established between the UNIs 108, 110 and 111 and the CPEs 112, 114 and 115.

In another example, CIR may be a service bandwidth capacity with performance guarantees for conforming traffic. The service level agreement (SLA) specifies the frame loss, jitter, and delay promised to the user or customer. In one embodiment, the performance guarantees are included in the SLA. The SLA specifies the communications guarantees, thresholds, and actions that are agreed to by the communications service provider and a user. Each of the UNIs 108, 110 and 111 may have a specified bandwidth CIR.

Configurations such as multipoint communications may introduce natural conditions such as oversubscription. Bandwidth congestion states may result under an SLA when multiple UNIs communicate with a single UNI simultaneously. Therefore the bandwidth capacity SLA is relevant to the UNI port use itself. Frame loss, discards, or changes to packet treatment may be fully acceptable once egress traffic of a UNI exceeds the CIR or EIR thresholds, indicating the user is breaking the boundary or threshold of allowable service defined by the SLA. In one embodiment, a number of different alarms or alarm types may indicate when, how, and why packets are being discarded and how many packets are being communicated for purposes of troubleshooting and reconfiguring network devices. The alarms or state indicators of the utilization for a UNI port is required to perform the SLA monitoring. Due to loss measures being conducted at two points in the network (near and far-end) the capacity state information for a UNI may be shared or exchanged with the user and the far-end equipment in order for the far-end to be informed of the UNI port utilization state during times of packet loss. The state alarm or indicator may be generated by a service provider device before the questionable packets are received.

In one embodiment, the CPEs 112, 114 and 115 may be routers. In another embodiment, the UNIs 108, 110 and 111 may be switches or other intelligent network devices. The UNIs 108, 110 and 111, the CPEs 112, 114, and 115, the server 106 and other computing and communications devices within the communications system 100 may include a processor and memory as well as other communications and computing elements including, but not limited to busses, motherboards, circuits, ports, interfaces, cards, connections, leads, transceivers, displays, antennas, caches, buffers, ports, power supplies, drivers, and other similar components. In another embodiment, certain illustrative embodiments may be implemented by instructions stored within the memory or by a specialized computing device. In yet another embodiment, the logic may be integrated, hardwired, programmed, or stored within a circuit, chip, or card. As described, the UNIs 108, 110 and 111 analyze SLA compliance or noncompliance as well as generating relevant alarms utilizing measurements, determinations, and logic.

The communications management system 104 is one or more devices utilized to enable, initiate, route, and manage communications between the elements of the communications system 100. The communications management system 104 may include one or more devices networked to manage the communications network 102. For example, the communications management system 104 may include any number of servers, routers, switches, or advanced intelligent network devices. In one embodiment, the server 106 may be configured to receive alarms from each of the devices of the communications system 100. The server 106 may then redistribute the alarms and associated information according to preferences established by one or more service providers and users. The intermediary devices 116 and 118 represent one or more devices that perform communications within the communications network 102. For example, the intermediary devices may include maintenance entities, access points, servers, repeaters, and other devices.

Figure 2:
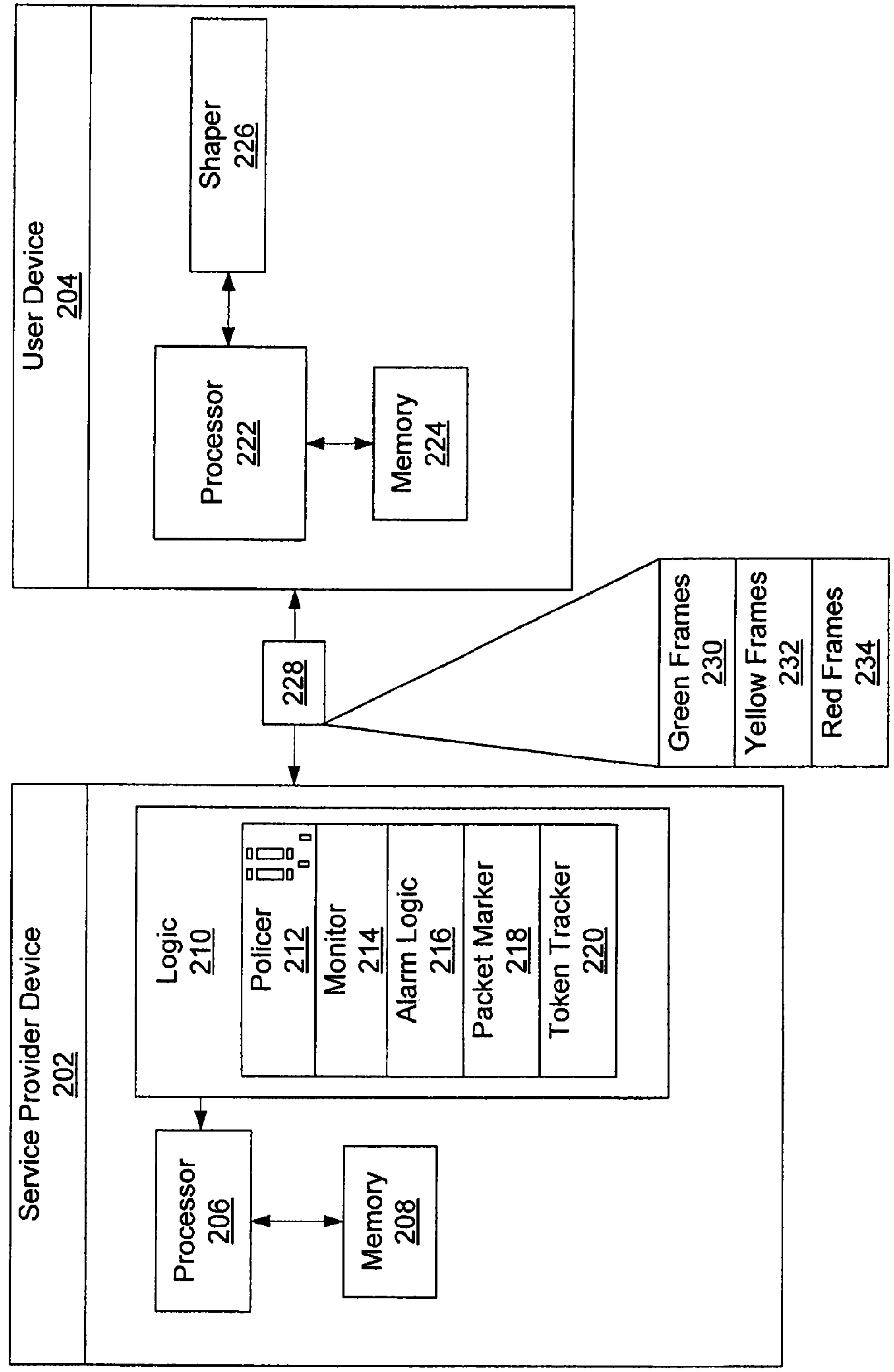
FIG. 2 is a block diagram of a user device and a service provider device in accordance with an illustrative embodiment.

FIG. 2 is a block diagram of a user device 204 and a service provider device 202 in accordance with an illustrative embodiment. The service provider device 202 may include a processor 206, a memory 208, logic 210, a policer 212, a monitor 214, alarm logic 216, a packet marker 218, and a token tracker 220. The user device 204 may include a processor 222, a memory 224, and a shaper 226. The service provider device 202 and the user device 204 may communicate messages 228 that may include green frames 230, yellow frames 232, and red frames 234.

In one embodiment, the service provider device 202 and user device 204 may represent a UNI-N and a UNI-C, respectively. The service provider device 202 and user device 204 may be a particular implementation of devices, such as the UNI 110 and CPE 114 of FIG. 1. In one embodiment, the service provider device 202 or UNI-N may provide a physical port for Ethernet communications to the user. The user device 204 may represent any number of client devices, networks, or communications systems, equipment, or devices, such as a UNI-C. The illustrative embodiments may be implemented in hardware, software, firmware, or a combination thereof.

The processors 206 and 222 are circuitry or logic enabled to control execution of a set of instructions. The processors 206 and 222 may be microprocessors, digital signal processors, central processing units, application specific integrated circuits, or other devices suitable for controlling an electronic device including one or more hardware and software elements, executing software, instructions, programs and applications, converting and processing signals and information, and performing other related tasks. The processors 206 and 222 may be a single chip or integrated with other computing or communications elements.

The memories 208 and 224 are hardware elements, devices, or recording media configured to store data for subsequent retrieval or access at a later time. The memories 208 and 224 may be static or dynamic memory. The memories 208 and 224 may include a hard disk, random access memory, cache, removable media drive, mass storage, or configuration suitable as storage for data, instructions, and information. In one embodiment, the memories 208 and 224 and processors 206 and 222 may be integrated in their respective devices. The memories 208 and 224 may use any type of volatile or non-volatile storage techniques and mediums. In one embodiment, the memories 208 and 224 may store the performance management information, data, and states that are monitored, measured, logged, and tracked as herein described.

The memories 208 and 224 may include any number of databases for tracking transmitted and received packets from one or more UNIs, nodes, maintenance entities, or other devices, elements, or modules. The service provider device 202 and the user device 204 may include any number of computing and telecommunications components as previously described.

The traffic policer 212 is a device or logic operable to monitor network traffic for conformity with the SLA and stipulated bandwidth profiles. In one embodiment, the policer 212 is hardware-based logic that my be configured as bi-directional or uni-directional. For example, the policer 212 may be an application specific integrated circuit or field programmable gate array (FPGA). If necessary, the policer 212 discards traffic to enforce compliance with the SLA. In particular, the policer 212 may process or treat packets, frames, or other data elements based on a category or colored marking which uses different types of QoS or priority bit marking schemes. For example, green, yellow, and red frames may be utilized to indicate the priority of frames from highest to lowest (discard). For example, the policer 212 may discard red frames 234 as established by the packet marker 218 or other elements.

Packetized data may be transmitted via frames. Frames are variable length data blocks with a fixed minimum inter-frame gap dependant upon the speed of the port interface. The amount of bits that may be carried at any time varies based upon the amount of frames being transmitted. The amount of capacity available is determinable by using the maximum port speed minus the number of frames present per time period multiplied by the inter-frame gap and other non payload bits. Any number of frame sizes may be utilized concurrently, each of which includes different amounts of data increasing or decreasing the bandwidth associated with each type of frames, such as standard 1518 byte frames and jumbo frames that may carry up to 90000 bytes of payload. Utilization of dynamic bandwidth thresholds based on frame rate is further described in patent application Ser. No. 12/412,141 entitled System and Method for Dynamic Bandwidth Determinations filed Mar. 26, 2009, which is herein incorporated by reference. The policer 212 may be forced to perform shaping by remarking packets or discarding packets exceeding thresholds in response to improper shaping by the shaper 226.

The monitor 214 is a measurement device operable to determine throughput and communications characteristics and statistics for data, packets, frames, and communications coming into and leaving the service provider device 202. The monitor 214 may measure or calculate various forms of offered, received, accepted, and delivered throughput. The alarm logic 214 is logic operable to transmit a signal to indicate to a receiving party that a portion of an end-to-end-line is discarding packets or has failed at a logical or physical level.

The packet marker 218 is logic operable to assign or reassign designations to the messages 228 as received at the service provider device 202. In particular, the packet marker 218 may mark or re-mark packets, frames, or other communications elements as green frames 230, yellow frames 232, or red frames 234. The packet marker 218 may re-mark the frames based on thresholds of CIR and EIR traffic incoming from the user device 204. In one embodiment, the necessity of re-marking frames may indicate that the shaper 226 is not configured properly and as a result the alarm logic 216 may generate one or more alarms based on the customer traffic being out of service conformance. In one example, the customer traffic exceeds the CBS value for a sub-second duration. Although the traffic seems to comply with CIR over the full second traffic is still rejected due to the CBS compliance violation. The network conditions may include the number of packets discarded, the time each packet is discarded, the CIR and EIR bandwidth when the packets are discarded, network, device, and connection utilization, and short-term and long-term bandwidth averages for the service provider device 202.

CIR and EIR frames are marked via use of the priority bits or other packet header coding by the service provider traffic control mechanism, such as the policer 212. Customer equipment may also mark frames via employment of a shaper or policing function. In both cases, a two rate, three color shaper or policer is generally employed to rate limit, shape, and mark frames based on their specific bandwidth profile provisioning. In one embodiment, green frames may be those CIR frames marked by the traffic control function, yellow frames may be those marked as EIR, and red frames may be those frames that are considered "out of conformance" and discarded by the traffic function. The traffic control function detects types of discard and may inform the network and customer via state tracking and OAM signaling when the traffic has exceeded CIR, EIR, CBS, or EBS. CBS and EBS are burst allocations that may allow traffic to momentarily exceed the CIR rate or EIR rate in order to not lose frames.

Figure 3:
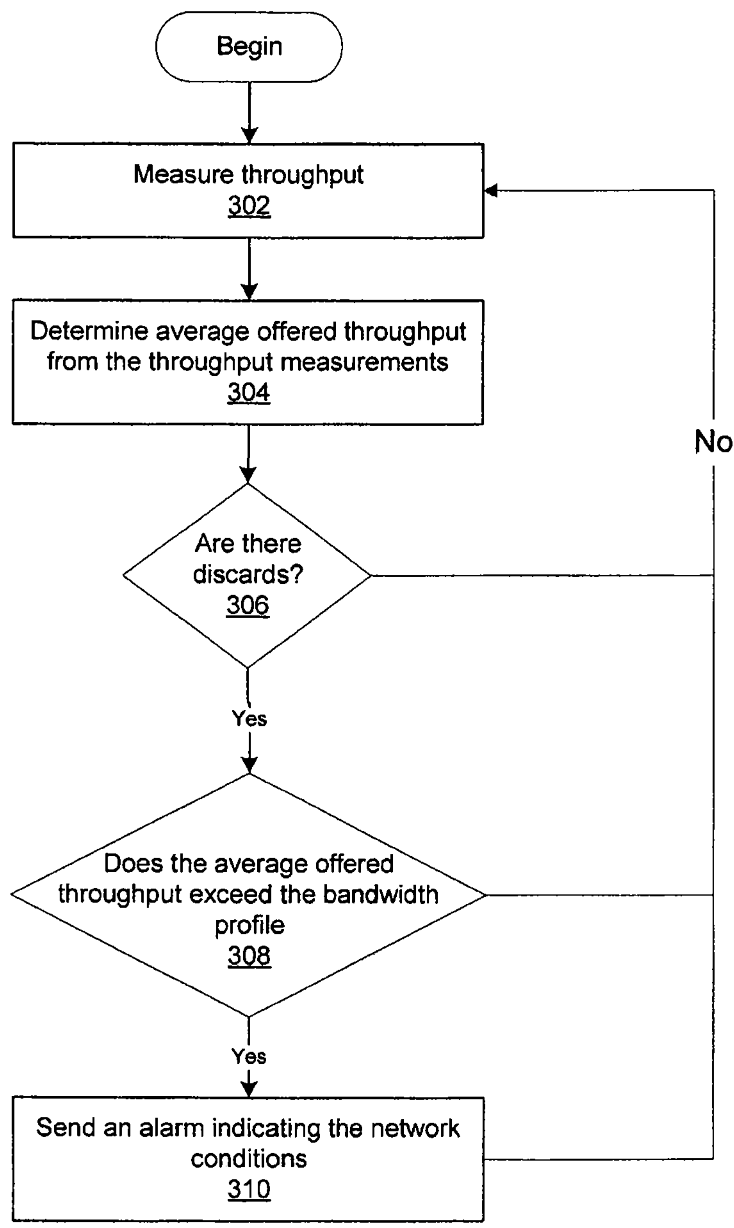
FIG. 3 is a flowchart of a process for monitoring offered throughput in accordance with an illustrative embodiment.
Figure 4:
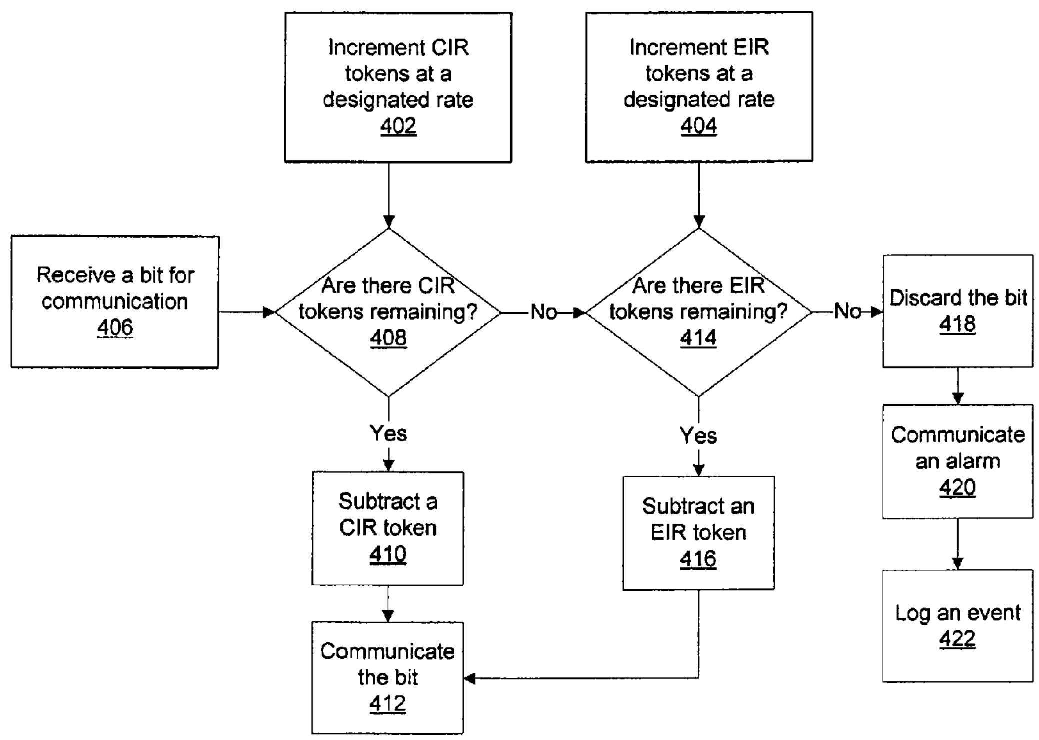
FIG. 4 is a flowchart of a process for tracking tokens for performing communications in accordance with an illustrative embodiment.

CBS and EBS violations may occur in momentary bursts that seem to comply to a seconds based average throughput or capacity. One example of such a scenario, is where the line rate greatly exceeds the CIR speed such as a CIR of 50 megabytes on a Gig-E (1000 Meg) port. As a result, a burst may exceed 500 megabits for a portion of a second, however the megabytes per second yield a number below 50 megabits per second. In one embodiment, the traffic control functions track the CBS, and EBS token levels while tracking the overall seconds based utilization. When a frame attempts to retrieve a CBS or EBS token and none exist a CBS/EBS violation state may be indicated when the frame is discarded. State and performance tracking and alarm generation of this type may provide the visibility of the non-conforming burst traffic that appears in CIR conformance. FIGS. 3 and 4 further illustrate these systems, processes, and methods.

The token tracker 220 is logic operable to track tokens utilized to authorize communications and bursting. In one embodiment, the token tracker 220 includes multiple counters, incrementors, subtractors, and other mathematical operators or logic elements. The token tracker 220 may communicate packets, frames, bytes, or bits from the service provider device 202 utilizing the tokens as authorization. In one embodiment, the token represents authorization to communicate one byte of transmittable data per token. However, the token may represent a bit, packet, frame, or other data element that may be communicated in a communications network. In one embodiment, the tokens bit allocation may not account for preambles, inter-frame gap (IFG), or other similar overhead components. The service provider device 202 and the user device 204 may account for the largest allowable packet size that may be communicated between the devices. For example, the tokens utilized to track and regulate communications may be associated with the frame rate to ensure that a specified bandwidth is still allowed and regulated despite the size of frames communicated. In yet another application the token bit application may be modified by deducting the amount of frames per second multiplied by a given overhead value.

The shaper 226 is a controller or scheduler for governing communications of queued data or otherwise scheduling the frequency of packet communications. In particular, the shaper 226 controls traffic in a communications network to optimize or guarantee performance. More specifically, the shaper may be operable to shape traffic or take other actions on a set of packets (i.e. communications stream, flow, signal) to impose additional delay on those packets such that the packets conform to one or more predetermined constraints. The constraint may be a bandwidth profile specified by the SLA. The shaper 226 may shape traffic by performing bandwidth throttling and rate limiting for communications to the service provider device 202 as well as other nodes, entities, devices, points, ports, or elements. In one embodiment, the shaper 226 may be operable to dynamically adjust bandwidth throttling and rate limiting of communications to the service provider device 202 in response to messages, alarms, and information received from the alarm logic 216.

The alarm logic 216 is logic configured to generate an alarm. In one embodiment, the alarm is embedded in an alarm indicator signal (AIS) with coding to indicate the service conformance problem to be communicated to a number of other devices and parties. In particular, the alarm logic 216 may generate alarm categories based on the severity of the discards or loss detected by the monitor 214. In one embodiment, the differently colored alarms may correspond to a category or severity of an alarm. These alarms are to be presented to the customer via the UNI-N demarcation location, or other visual or audio indication of a status and problem. In one embodiment, the alarm logic 216 or the packet marker 218 may mark packets or generate alarms. The alarms may vary based on the utilization rate of bandwidth between the service provider device 202 and the user device 204 at a time when loss occurs. For example, alarm severity may be highest at low utilization rates when there should be no loss. In one embodiment, the alarm logic 216 may utilize loss rates or percentages to indicate a category and information for the alarm. For example, green may indicate less than 1% loss and may be considered a minor alarm or not generate an alarm at all. A yellow alarm may indicate there is a loss of between 1-6% and may be considered a major alarm. Any loss above 6% may indicate a critical alarm.

The alarm logic 216 may be configured to send alarms to both the service provider and an applicable user in an operation administration maintenance (OAM) packet. The alarm logic 216 may also activate a local indicator that indicates packets are being discarded at the service provider device 202. For example, the indicator may be one or more LED lights or an application that may activate pop-up alerts on a wireless device or computer system of a network operator or send text or email notifications. The alarm logic 216 may also communicate the alarm utilizing EMS.

In one embodiment, the processes of FIGS. 3-7 may operate independently. In another embodiment, the various processes and steps may be integrated and/or utilized interchangeably. FIG. 3 is a flowchart of a process for monitoring offered throughput in accordance with an illustrative embodiment. The process of FIG. 3 may be implemented by a device, such as a network UNI. In one embodiment, a policer of the UNI may perform the measurements, determinations, and signaling of FIG. 3. The illustrative embodiment may allow one or more service providers and users to track rejected or discarded traffic. Network or device monitoring, reconfiguration, or any number of actions may be implemented based on the information and alarms generated during the process of FIG. 3.

The process of FIG. 3 may begin by measuring throughput (step 302). In one embodiment, throughput is the average rate of successful packet delivery over a communications link or between devices. For example, the communications may occur between a UNI-N and a UNI-C.

Next, the UNI determines an average offered throughput from the throughput measurements (step 304). The average offered throughput is an average of the throughput offered from the user or received by the network UNI. The offered throughput may be averaged over any number of time intervals. For example, the offered throughput may be averaged for one second of communications between the UNI-C and the UNI-N.

Next, the UNI determines whether there are discards (step 306). During step 306, the UNI may determine whether the offered throughput is rejected. The packets may also be marked as discarded, logged, or otherwise deleted. In one embodiment, there are discards if frames are marked red as previously discussed. If there are no discards, the UNI returns to measure throughput (step 302).

If there are discards in step 306, the UNI determines whether the average offered throughput exceeds a bandwidth profile (step 308). The bandwidth profile may be specified by a service level agreement. In one embodiment, the SLA may specify a CIR level of 50 Mb/s. If the user is sending 60 Mb/s, the SLA is determined to be exceeded.

The determination of step 308 may provide additional information for determining why there are discards as determined in step 306. For example, the user may be sending communications that would monopolize resources and cause problems if propagated through the rest of a communications network. As a result, the packets or communications above a threshold, such as a threshold specified by the SLA, may be discarded. If the UNI determines the average offered throughput does not exceed the bandwidth profile, the UNI returns to measure throughput (step 302).

If the UNI determines the average offered throughput exceeds the bandwidth profile in step 308, the UNI sends an alarm indicating the network conditions (step 310). The network conditions may provide information specifying why there are discards and whether the discards are justified or not based on the bandwidth profile or other criteria that may be utilized to perform the determinations of steps 306 and 308. The alarm may be embedded in an AIS. AIS is an operation administration and maintenance function used for fault management in communications systems, devices, and equipment. In one embodiment, the alarm may be sent to a device at a far end. In another embodiment, the alarm may be sent to multiple points in a configuration, such as an Ethernet multipoint service (EMS).

During step 310, the UNI may also log or record information, such as network conditions, the time of each discard, the number of discards, throughput levels, and other information that may be associated with the discards. The information may be recorded or stored in a database or other electronic record. Any number of lights, alarms, or other indications may be communicated to users locally or remotely. In one embodiment, the UNI may include a number of light emitting diodes that indicate when discards occur and/or when discards occur when the bandwidth profile is exceeded. The alarm may be utilized to reconfigure the shaping performed by one or more devices, ports, or modules communicating with the UNI.

FIG. 4 is a flowchart of a process for tracking tokens for performing communications in accordance with an illustrative embodiment. The process of FIG. 4 may be implemented by a policer of a UNI. In one embodiment, the policer may include counters, repositories, or hardware and/or software modules for tracking CIR tokens for standard communications and EIR tokens for bursting. For example, each token may correspond to a count value and the count value may include eight bytes. In another embodiment, bursting tokens may authorize one frame to be sent based on the frame size. The policer may also include logic for making various determinations, implementing changes, communication alarms, and logging information. In one embodiment, the UNI may be a service provider network interface device (NID) with a port dedicated to a user. The method of FIG. 4 may be performed for communications transmitted through the port of the NID.

The process of FIG. 4 may begin by incrementing committed information rate (CIR) tokens at a designated rate (step 402). The CIR tokens may be tracked by a CIR counter. The CIR tokens may account for bandwidth that is dedicated to the standard communications of a user that is refreshed at a specified rate. In one embodiment, the CIR tokens may correspond to a bandwidth profile, SLA, or other contractual agreement between the service provider and the user. For example, the user may have agreed to purchase bandwidth of 20 Mb/s. As a result, the CIR tokens may be incremented at a corresponding rate of 20 Mb/s. In one embodiment, the CIR tokens may be increased to a specified threshold or maximum number of tokens. For example, the CIR tokens may not exceed the allotted bandwidth of 20 Mb/s. In another embodiment, the threshold may be 25 Mb/s. The tokens may be decremented as packets, frames or bytes associated with the agreed upon rate and then communicated by the policer.

Simultaneously, the policer increments excess information rate (EIR) tokens at a designated rate (step 404). The EIR may correspond to another designated rate. For example, the agreement between the service provider and the user may provide for bursting. Bursting allows the user to temporarily exceed the CIR to send additional bits. The designated rate for the EIR may be for a specified time interval. For example, 15 Mb of tokens may be added or refreshed every three seconds. As a result, bursting may exceed the CIR at least every three seconds. In another embodiment, the EIR tokens may be incremented to, but not exceed 50 Mb for every ten seconds. As a result, the user may burst until all of the 50 Mb of EIR tokens are utilized.

Simultaneously, the policers receive bits for communication (step 406). The bits may be received, ordered, packetized, queued, buffered, or otherwise processed for subsequent communications. The bits may also be assembled in bytes, packets or frames and are referred to as bits for purposes of simplicity.

Next, the policer determines whether there are CIR tokens remaining (step 408). The determination of step 408 may be made based on tokens or a count within a CIR counter. Any number of other functions or tracking systems may also be utilized to track conformance to SLA provisions. The determination of step 408 may indicate whether the CIR threshold for the UNI is exceeded. If it is not exceeded, the bit may be communicated. If there are tokens remaining, the policer subtracts a CIR token (step 410). The CIR token may also be subtracted from the CIR counter or the count reduced. The policer then communicates the bit, the bit may be communicated individually or according to a signaling protocol utilized by the applicable UNI, network, system, or device. For example, enough bits for a packet and corresponding frame may be queued before communicating the bits to another entity, device or point.

If the policer determines there are no CIR tokens remaining in step 408, the policer determines whether there are EIR tokens (step 414). The determination of step 414 indicates whether the policer may burst to communicate the bit. If there are EIR tokens remaining, the policer subtracts an EIR token (step 416). The EIR tokens may also be tracked and subtracted from an EIR counter. The policer communicates the bit (step 412).

If the policer determines there are no EIR tokens remaining in step 414, the policer discards the bit (step 418). Next, the policer communicates an alarm (step 420). The alarm may be sent for single bits or packets that are discarded because the CIR and EIR are exceeded. The alarm may indicate the utilization rate of the CIR or EIR tokens as well as the network conditions.

Next, the policer logs an event (step 422). The event may be the UNI or bandwidth environment, conditions, and characteristics associated with the discard occurring in step 418. The process of FIG. 4 may help a service provider and one or more users diagnose loss within a network. For example, modern devices may have such a high bandwidth capacity, that without proper shaping, a user may easily overwhelm available bandwidth, buffers, and other network elements operated by the service provider. A user may overwhelm the service provider in a sub-window of times utilized to calculate communications averages. For example, even though a user has a CIR of 1 Gb/s and an EIR of 1 Gb/s, the user may attempt to send 4 Gb/within ten milliseconds overwhelming the bandwidth and bursting capabilities of the UNI. The various forms of loss and discards may be monitored, tracked and alarms sent to applicable parties for enhanced network diagnosis. In another embodiment, the SLA may specify that the CIR may not exceed 1 Gb/s as averaged over the 100 milliseconds or 1000 microseconds within the second. For example, the user may not send the entire 1 Gb within 10 milliseconds which would be the equivalent of 10 Gb/s if sustained unless the EIR and CBS allow for bursting to that level. Sending such a large amount of data in a fraction of a second may overwhelm packet buffers and the processing abilities of the UNI unless proper shaping is performed.

Figure 5:
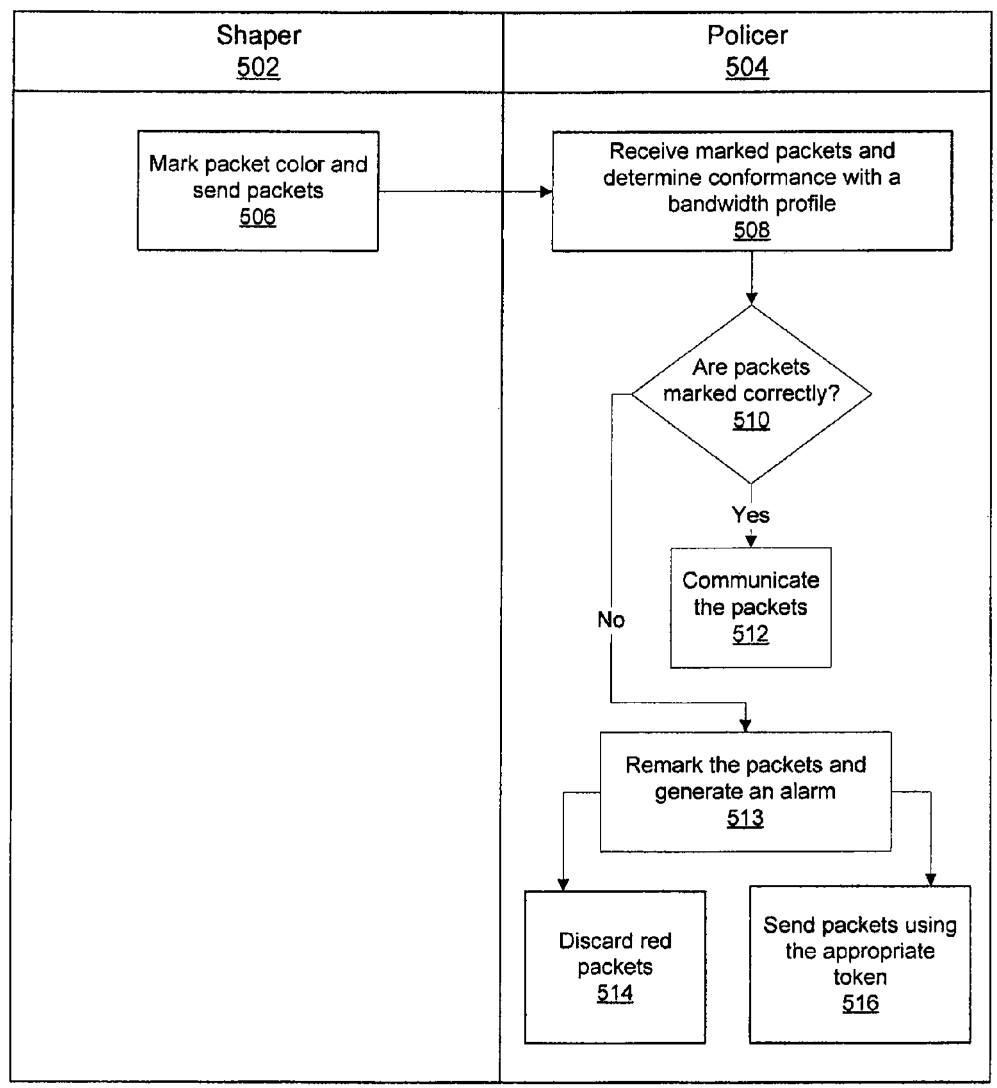
FIG. 5 is a flowchart of a process for re-marking packets in accordance with an illustrative embodiment.

FIG. 5 is a flowchart of a process for re-marking packets in accordance with an illustrative embodiment. The process of FIG. 5 may be implemented by a shaper 502 and a policer 504 in accordance with an embodiment. In one embodiment, the shaper 502 and policer 504 may be part of a color aware UNI-C and UNI-N that may process color-marked packets differently. The process may begin with the shaper marking packet color and sending packets (step 506). In one embodiment, the packet color is designated utilizing a P bit of the packet. For example, if a P bit is one it may indicate the packet is marked as green, whereas a P bit marked as zero may indicate the packet is marked as yellow. In one embodiment, the green packets may be priority packets, such as packets associated with voice communications. Lower priority data packets may be marked as yellow packets. The packets may be also associated with CIR or EIR traffic shaping as performed by the shaper 502.

Next, the policer receives the marked packets and determines conformance with a bandwidth profile (step 508). The policer may determine whether the communications traffic from the shaper 502 to the policer 504 complies with the bandwidth profile. The parameters and characteristics of the bandwidth profile may be specified by contractual and technical agreements, such as an SLA. For example, the incoming bandwidth may be analyzed and measured to determine if the CIR to the UNI is being exceeded.

Next, the policer 504 determines whether the packets are marked correctly (step 510). The packets may not be marked properly if the green and yellow packets exceed available CIR and EIR thresholds. For example, the CIR and EIR may be allotted utilizing tokens for communications. Similarly, the incoming packet categories may be compared against the bandwidth profiles to see if there are violations. In one embodiment, steps 508 and 510 may be combined.

If the packets are marked correctly, the policer communicates the packets (step 512). Step 512 may indicate that the shaper 502 or other applicable devices or elements are correctly shaping traffic and marking the frames, and as a result, that the communications are flowing correctly without discards or re-marking.

If the policer determines the packets are not marked correctly in step 510, the policer re-marks the packets and generates an alarm (step 513). The packets may be re-marked based on the bandwidth profile, thresholds, and previous packet markings. For example, yellow packets may be re-marked as red packets or immediately discarded. Similarly, green packets may be re-marked as yellow packets or red packets based on an exceeded CIR and/or EIR. The alarm of step 513 may correspond to the type of re-marking performed. For example, re-marking packets as red results in discarded or lost packets that may generate a critical alarm. Re-marking packets from green to yellow may generate a minor alarm. The alarm may include information regarding network conditions and circumstances that may be received by the shaper 502, end devices, and other parties to indicate why errors or losses may be occurring.

Next, the policer discards red packets (step 514). In one embodiment, the packets may be automatically discarded once marked red. One or more discard counters may determine the number of discards that have occurred for a number of time periods. The recorded information may allow the user and the service provider to determine why discarding is happening. In another embodiment, discarding the packets may be delayed, tracked, logged, or temporarily stored. The policer may simultaneously send packets using the appropriate token (step 516).

Figure 6:
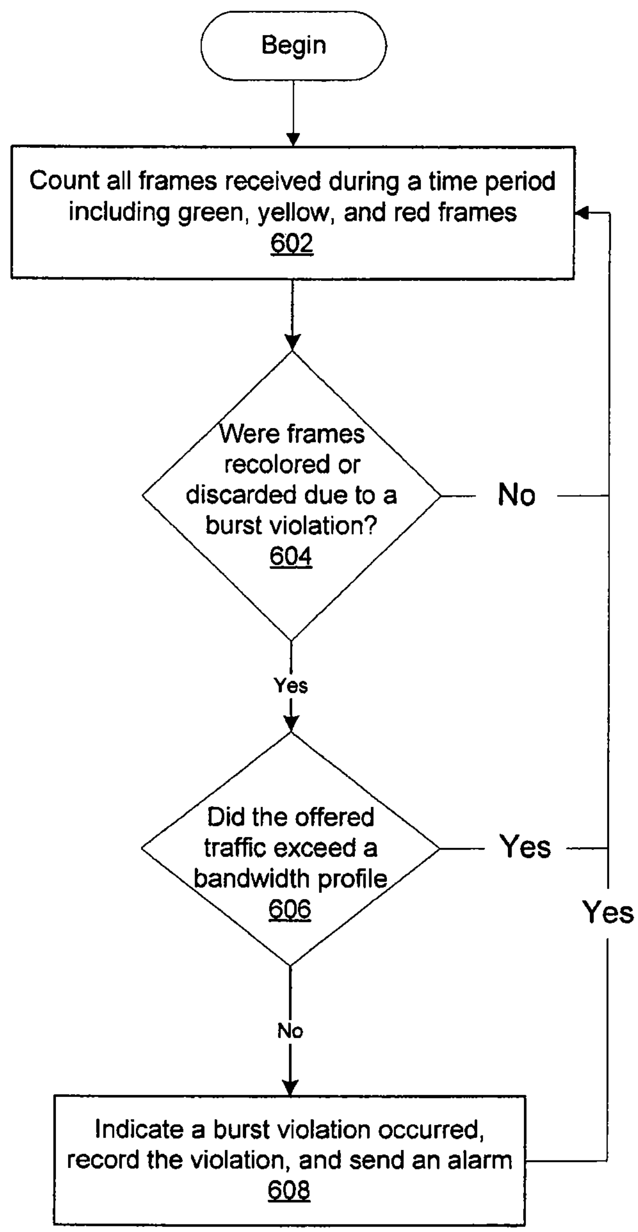
FIG. 6 is a flowchart of a process for tracking bandwidth violations in accordance with an illustrative embodiment.

FIG. 6 is a flowchart of a process for tracking bandwidth violations in accordance with an illustrative embodiment. The process of FIG. 6 may be implemented by a policer. In one embodiment, the policer and/or a shaper may be a two-rate, three-color shaper. The process of FIG. 6 may indicate that a burst violation has occurred even if longer term bandwidth averages do not indicate there was a violation. The process of FIG. 6 may begin by counting all frames received during a time period including green, yellow, and red frames (step 602). The frames may have been previously marked for communication.

Next, the policer determines whether frames are recolored or discarded (step 604). In one embodiment, the determination of step 604 may determine whether the available burst bandwidth is exceeded resulting in discarded traffic. The frames may be recolored or discarded in response to exceeding a CIR and/or EIR threshold. The bandwidth may be averaged over a specified time period or evaluated over micro intervals. For example, the CIR levels may be analyzed against a per second, millisecond, microsecond, or other smaller intervals as needed to ensure that the bandwidth profile is not exceeded. In one embodiment, the green frames may be recolored to yellow or red, and yellow frames may be recolored to red frames.

In one embodiment, the policer may include one or more counters that may track the number of each color of frames. In one embodiment, the policer may determine recoloring of frames utilizing a mathematical difference for frames being processed by the UNI for further communications. For example, the number of green frames originally counted in step 602 may be compared to the number of green frames before they are communicated to the next UNI, entity, device or entity. As previously described, the status or coloration of the packet may be set and reconfigured in a P bit. In response to determine the frames are not recolored or discarded, the policer returns to count all frames received during a time period including green, yellow and red frames (step 602).

If the policer determines frames were recolored or discarded in step 604, the policer determines whether the offered traffic exceeds a bandwidth profile (step 606). The determination of step 606 may determine whether the policer is attempting to send packets or bits when the burst counter or buffer is zero. If the offered traffic exceeds a bandwidth profile, the policer returns again to step 602.

If the policer determines the offered traffic does not exceed a bandwidth profile in step 606, the policer indicates a burst violation occurred, records the violation, and sends an alarm (step 608). If the offered traffic does not exceed the bandwidth profile even though there have been frame recolorations or discards, the policer is likely experiencing a burst violation that may overwhelm the processing and bandwidth allocated to a user. The burst violation indicator and alarm may indicate that burst allocations in the shaper may need to be reconfigured if the user does not want packets to be dropped, such an indication may avoid the need to perform expensive in-person network testing. For example, the user may have contracted for a bandwidth of 20 Mb/s, but may have GigE equipment that is effectively sending 800 Mb/s because of the available communications speeds of the GigE equipment utilized by the user. The user may not be properly shaping based on the SLA between the user and the service provider. The user may have utilized all available EIR tokens and as a result is not able to burst anymore resulting in discarded traffic that is not the fault of the service provider. The indicator of step 608 provides information regarding bursting problems useful to the service provider and user.

Figure 7:
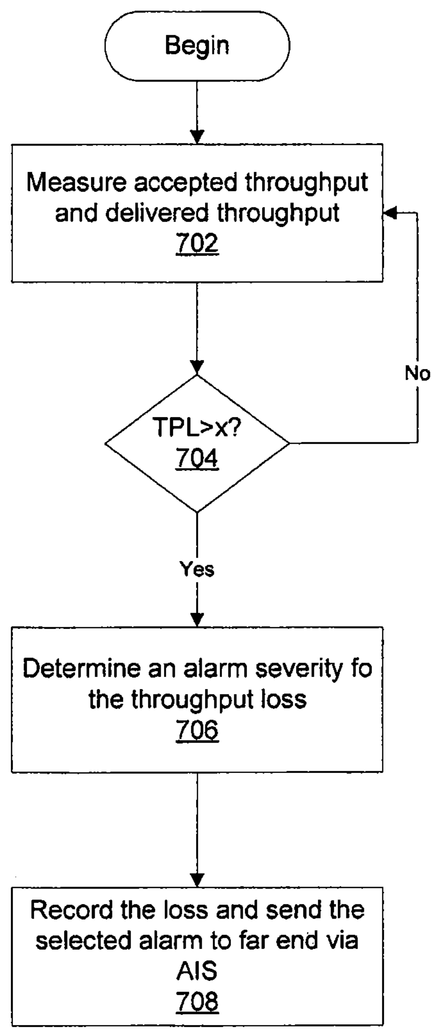
FIG. 7 is a flowchart of a process for measuring throughput loss in accordance with an illustrative embodiment.

FIG. 7 is a flowchart of a process for measuring throughput loss in accordance with an illustrative embodiment. The process may be implemented by a policer or shaper utilized by a service provider. For example, the policer may be integrated with a UNI-N as previously described. In another embodiment, the user may perform the process as herein described between points or entities of the communications network. The throughput measurements may be performed by a maintenance entity or an IP entity at any number of network layers. The process may begin by measuring accepted throughput and delivered throughput (step 702).

Next, the policer determines whether the throughput loss (TPL) is greater than a threshold (x) (step 704). In one embodiment, the throughput loss may be equal to the (Accepted throughput−Delivered throughput) Accepted throughput. The threshold may be a rate of loss or a percentage, such as 5 Mb/s or 4%. In one embodiment, the policer may utilize a number of thresholds to determine the severity of the loss. For example, the thresholds may correspond to three alarm types increasing in severity including minor, major, and critical.

Next, the policer determines an alarm severity for the throughput loss (step 706). The policer may utilize any number of dynamic thresholds or rates to determine the severity of the loss and accepted ingress throughput to classify and generate an alarm during step 706. Next, the policer records the loss and sends the selected alarm to a far end via AIS (step 708).

Figure 8:
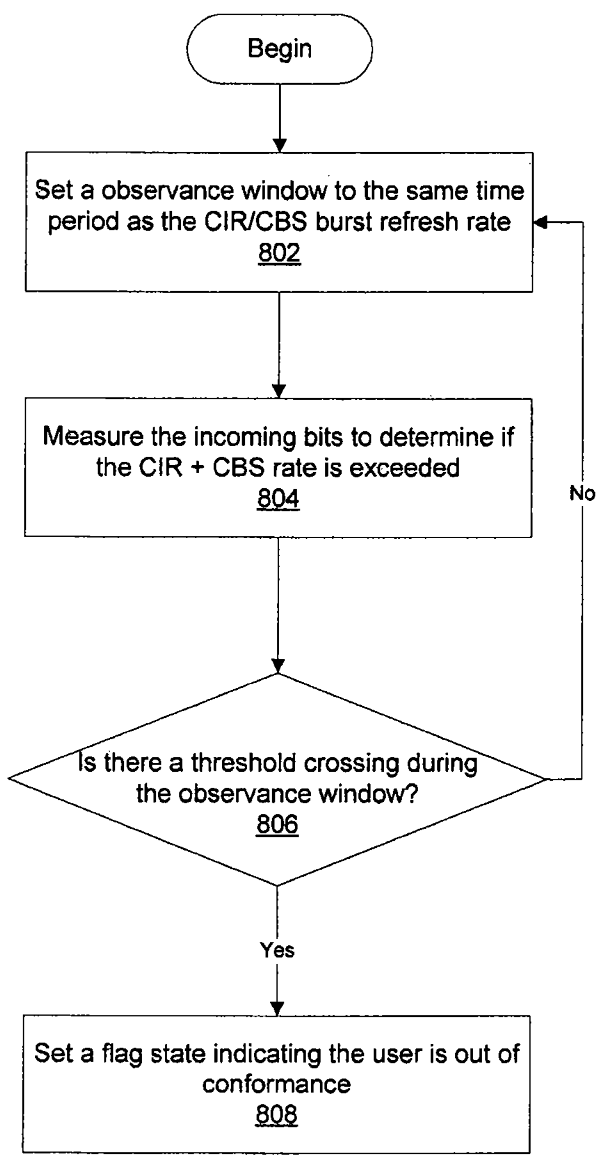
FIG. 8 is a flowchart of a process for determining compliance with a burst rate in accordance with an illustrative embodiment.

FIG. 8 is a flowchart of a process for determining compliance with a burst rate in accordance with an illustrative embodiment. In some cases mismatched UNIs or other devices may cause problems between a service provider and a user. For example, the user may have the newest and greatest communications equipment that bursts beyond the CIR which may become a problem at a policer to the slower rate interface. The user may have Gig-E (1000 Mb/s) equipment while the service provider utilizes FAST-E (100 Mb/s) equipment to offer a 50 Mb/s connection. The Gig-E equipment may not only exceed the 50 Mb/s connection as well as an additional 5 Mb every 2 seconds. A determination of whether the user exceeds burst allocations may be determined by measuring CIR and bursting over a sliding window that follows the burst rate refresh window.

In one embodiment, the process of FIG. 8 may be implemented utilizing a shift register for counting bits in and out. For example, the shift register may be integrated with a NID or CPE device and positioned before a policer into a service providers core network. The process may begin by setting an observance window to the same time period as the CIR/CBS burst refresh rate (step 802). In one embodiment, the observance window is a sliding window that allows bits received to be measured for the time period of the observance window. For example, the bursting bucket or burst tokens may be refreshed every two seconds and as a result, the observance window is two seconds. The refresh rate may be stipulated by the SLA or based on network conditions allowed by the service provider.

Next, the counter measures the incoming bits to determine if the CIR plus CBS rate is exceeded (step 804). In other words the traffic including regular traffic and bursting traffic are measured to determine the overall traffic. The counter may measure bits because many policers are only interested in bits rather than frames per second. In some cases, the user may not properly shape traffic to comply with bit rates because of a misunderstanding or miscalculation of bits per second as compared to frames per second, each of which may be affected by frame sizes, sequential burst frames, and interframe gap.

Next, the counter determines whether there is a threshold crossing during the observance window (step 806). The determination of step 806 may be performed by the smart counter or based on tracking logic in communication with the counter. A threshold crossing may occur when the specified CIR and burst rate as measured in bits are exceeded during the observance window. If there is not a threshold crossing during the observance window, the counter sets an observance window to the same time period as the CIR/CBS burst refresh rate (step 802).

If there is a threshold crossing during the observance window in step 806, the counter sets a flag state indicating the user is out of conformance (808). The flag state may indicate that bursting violations are occurring and may be indicated directly to the user. The flag state may also be utilized to generate one or more alarms.

In another embodiment, the maximum CIR+CBS rate may be evaluated with micro intervals for the observance window. For example, the 1/maximum rate (s) may be utilized as the observance window to ensure that the queuing, caching, or other technical limitations of the slower interface and connection are not overwhelmed by the faster interface. For example, the CIR and burst rate may be evaluated in nano, pico, micro, or milliseconds rather than seconds. The measurements may be performed in individual units or multiples that allow a more accurate determination of the CIR and CBS rates to be determined. For example, the observance window may be reduced to 10 ns intervals to determine whether there is a threshold crossing. An ultra-fast counter and logic may ensure that slower interfaces and equipment are not overwhelmed by users that may have bought the newest and greatest communications equipment without performing the proper shaping and internal packet, frame, and bit management. For example, a time period such as 100/max rate, 10/max rate, 50/available rate, 25/the reciprocal of the rate, or some other factor of the maximum or available rate capacity may be utilized to evaluate the CIR and CBS rates over a mini-observance window. The CIR rate and CBS rate may be converted to the equivalent rate for the adjusted observance window. For example, instead of measuring traffic over one second, the observance window may be reduced to 100 nano seconds and threshold comparisons may occur for the CIR and CBS rate at those levels. In some cases, even the caching or buffering systems may be overwhelmed by equipment, devices or systems with disjointed communication rates and capacities.

Certain illustrative embodiments of the described inventive concepts may be embodied in hardware, software, firmware, or a combination thereof. For example, in one embodiment the processes described herein may be encoded on a computer-readable medium, a hard disk drive, an ASIC, a PGA, ROM or any other suitable storage device or digital circuitry suitable to be utilized with or within a network device.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed:

1. A network device for managing communications, the network device comprising:

a first counter operable to track CIR tokens, wherein the first counter is operable to increase the CIR tokens at a first rate;

a second counter operable to track EIR tokens, wherein the second counter is operable to increase the EIR tokens at a second rate;

logic in communication with the first counter and the second counter, wherein the logic is operable to determine whether there are EIR tokens in response to a determination that there are not CIR tokens, wherein the logic is further operable to command the second counter to decrement the EIR tokens in response to a determination that there are EIR tokens, and wherein the logic is further operable to communicate a data unit from the network device through a network in response to decrementing the EIR tokens.

2. The network device according to claim 1, wherein the logic is further operable to discard the data unit in response to determining there are no EIR tokens in the second counter.

3. The network device according to claim 2, wherein the logic is operable to communicate an alarm to one or more parties communicating with the network device, and wherein the logic is operable to log communications conditions at the time of the discard.

4. The network device according to claim 3, wherein the alarm indicates corrections for a second network device in communication with the network device to avoid additional discards.

5. The network device according to claim 1, wherein the data unit is queued for communication at the network device based on availability of the CIR tokens or EIR tokens.

6. The network device according to claim 1, wherein the network device is managed by a communications service provider.

7. The network device according to claim 1, wherein the first rate and the second rate are associated with a CIR and an EIR of a service level agreement.

8. The network device according to claim 1, wherein the logic is configured to:

decrement the CIR tokens in response to determining there are CIR tokens;

communicate the data unit through the network in response to decrementing the CIR tokens.

9. The network device according to claim 1, wherein the data unit is any of a bit, byte, packet, or frame.

10. The network device according to claim 1, wherein the network device is any of a rate shaper, a policer, and customer side user network interface, or a network side user network interface.

11. A method for managing bursting traffic, the method comprising:

incrementing CIR tokens at a first rate;

incrementing EIR tokens at a second rate;

receiving a data unit for communication through a network device;

determining whether there are EIR tokens in response to a determination that there are no CIR tokens;

decrementing the EIR tokens in response to a determination that there are EIR tokens; and communicating the data unit from the network device through a network in response to the determination that there are EIR tokens and in response to decrementing the EIR tokens.

12. The method according to claim 11, further comprising:

decrementing the CIR tokens in response to determining there are CIR tokens;

communicating the data unit through the network in response to decrementing the CIR tokens.

13. The method according to claim 11, further comprising:

discarding the data unit in response to a determination that there are no EIR tokens;

communicating an alarm to one or more parties indicating that the data unit is discarded; and logging communications conditions at the time the data unit is discarded.

14. The method according to claim 11, wherein the CIR tokens are not incremented past a first threshold, wherein the EIR tokens are not incremented past a second threshold, and wherein the first threshold and the second threshold are associated with a CIR and an EIR of a service level agreement.

15. The method according to claim 13, wherein the alarm is sent to a plurality of parties associated with the network device, and wherein the data unit is any of a bit, byte, packet, or frame.

16. A network interface for managing communications bursting comprising:

a processor for executing a set of instructions; and a memory in communication with the processor, the memory being operable to store the set of instructions, wherein the set of instructions are executed to:

increment CIR tokens at a first rate, increment EIR tokens at a second rate, receive a data unit for communication through a user network interface, determine whether there are EIR tokens in response to a determination that there are no CIR tokens, decrement the EIR tokens in response to a determination that there are EIR tokens, and communicate the data unit from the network interface through a network in response to the determination that there are EIR tokens and in response to decrementing the EIR tokens.

17. The network interface according to claim 16, wherein the set of instructions are further operable to:

decrement the CIR tokens in response to determining there are CIR tokens, and communicate the data unit from the network interface through the network in response to decrementing the CIR tokens.

18. The network interface according to claim 16, wherein the set of instructions are further operable to:

discard the data unit in response to a determination that there are no EIR tokens, and communicate an alarm to one or more parties indicating that the data unit is discarded.

19. The network interface according to claim 18, wherein the set of instructions are further operable to:

log communications conditions at the time of the discard, and wherein the alarm provides reconfiguration information for one or more network devices in communication with the network interface to configure traffic to avoid additional discards.

20. The network interface according to claim 16, wherein the CIR tokens are not incremented past a first threshold, wherein the EIR tokens are not incremented past a second threshold, and wherein the first threshold and the second threshold are specified by a service level agreement.

* * * * *